US007796049B2

(12) United States Patent
Ito

(10) Patent No.: US 7,796,049 B2
(45) Date of Patent: Sep. 14, 2010

(54) OVERHEAD TRAVELING VEHICLE HAVING ID READER

(75) Inventor: Yasuhisa Ito, Inuyama (JP)

(73) Assignee: Murata Machinery, Ltd., Kyoto-shi (JP)

( * ) Notice: Subject to any disclaimer, the term of this patent is extended or adjusted under 35 U.S.C. 154(b) by 364 days.

(21) Appl. No.: 11/933,657

(22) Filed: Nov. 1, 2007

(65) Prior Publication Data

US 2008/0106414 A1 May 8, 2008

(30) Foreign Application Priority Data

Nov. 2, 2006 (JP) ............................ 2006-298754

(51) Int. Cl.
*G08B 21/00* (2006.01)

(52) U.S. Cl. ....................... 340/673; 340/10.1; 700/225

(58) Field of Classification Search ............. 340/572.1, 340/10.1, 10.2, 10.3, 10.4, 673; 414/940, 414/416.05, 805, 217, 626, 814; 700/225
See application file for complete search history.

(56) References Cited

U.S. PATENT DOCUMENTS 6,183,184 B1 * 2/2001 Shiwaku ..................... 414/281
6,504,144 B1 * 1/2003 Murata ....................... 250/224
6,579,052 B1 * 6/2003 Bonora et al. .......... 414/222.01
6,715,978 B2 * 4/2004 Lin et al. ............... 414/416.05
6,848,882 B2 * 2/2005 Chen et al. .................. 414/626
6,884,989 B2 * 4/2005 Murata ....................... 250/221
7,054,714 B2 * 5/2006 Hocke et al. ................ 700/225
7,356,428 B2 * 4/2008 Ciminello et al. ........... 702/104
7,413,396 B2 * 8/2008 Ito ............................ 414/626
2002/0197136 A1 * 12/2002 Huang et al. ................ 414/217
2004/0118980 A1 * 6/2004 Chang et al. ................ 246/1 C
2005/0079041 A1 * 4/2005 Campbell et al. ........... 414/626
2006/0237525 A1 * 10/2006 Sone .......................... 235/375
2007/0103107 A1 * 5/2007 Hayashi ...................... 318/466
2007/0285253 A1 * 12/2007 Sharma et al. ........... 340/572.7
2009/0276082 A1 * 11/2009 Murata ....................... 700/226

FOREIGN PATENT DOCUMENTS

JP 5-9000 A 1/1993
JP 05-077906 A 3/1993
JP 05-217014 A 8/1993
JP 2002-182742 A 6/2002
JP 2002-182743 A 6/2002
JP 2005-206371 A 8/2005
JP 2006-298566 A 11/2006

OTHER PUBLICATIONS

Office Action dated Jun. 12, 2008, issued in corresponding Japanese Patent application No. 2006-298754.

* cited by examiner

*Primary Examiner*—Daniel Wu
*Assistant Examiner*—Rufus Point
(74) *Attorney, Agent, or Firm*—Westerman, Hattori, Daniels & Adrian, LLP

(57) ABSTRACT

During traveling of an overhead traveling vehicle, an ID reader reads an ID provided at a lower position on a back surface of a cassette, while moving the cassette in a lateral direction.

5 Claims, 5 Drawing Sheets

3 3 2 6 8 10 12 18 14 16 16 22 21 23 26 24 20 24 4

F I G. 2
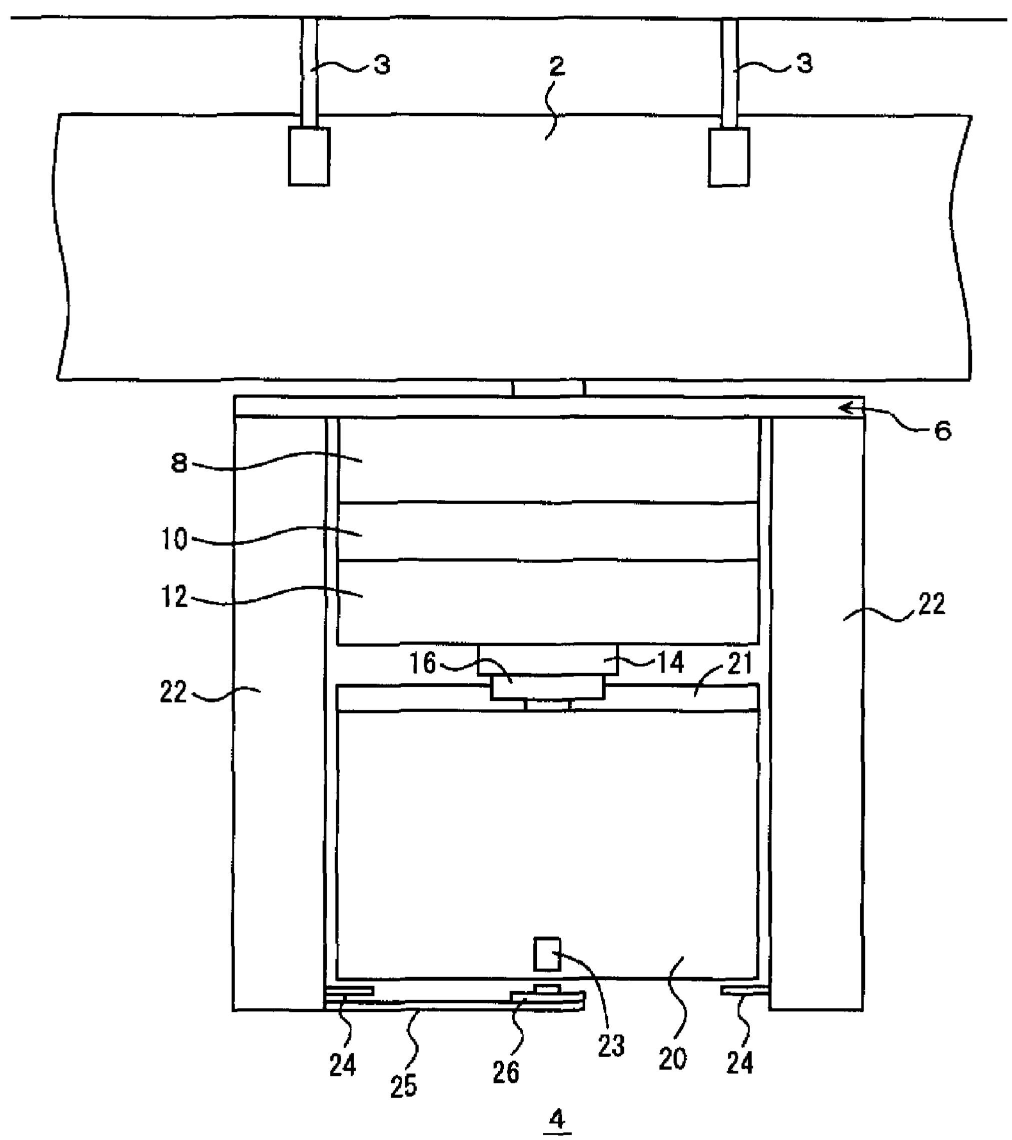

F I G. 4
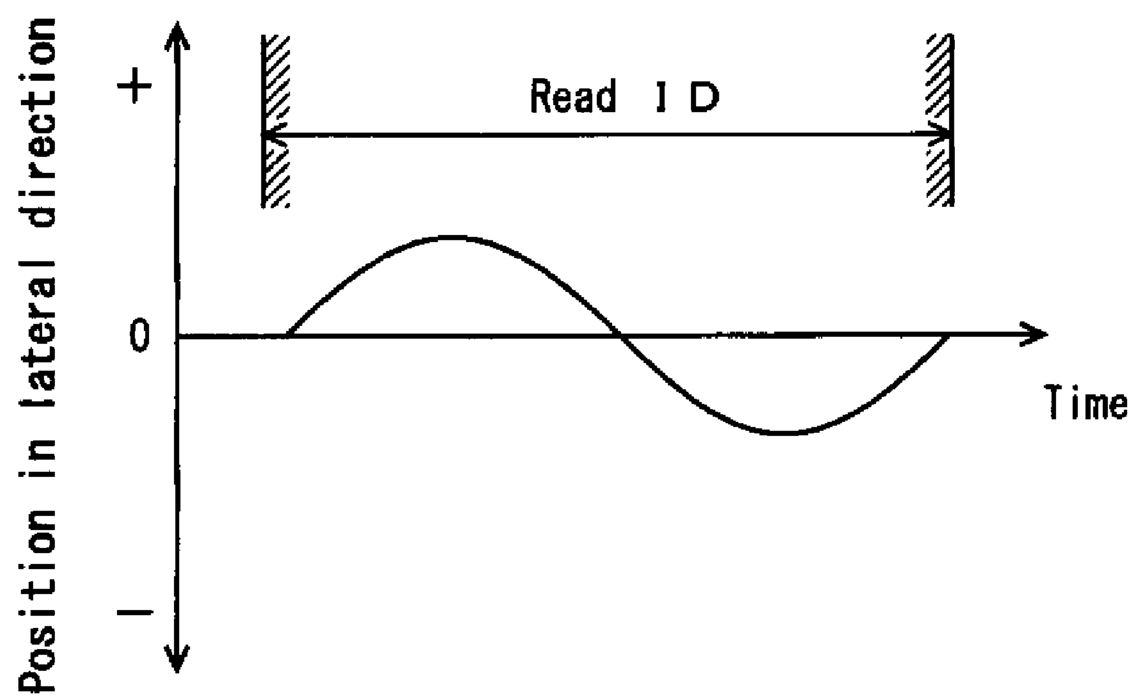

F I G. 5
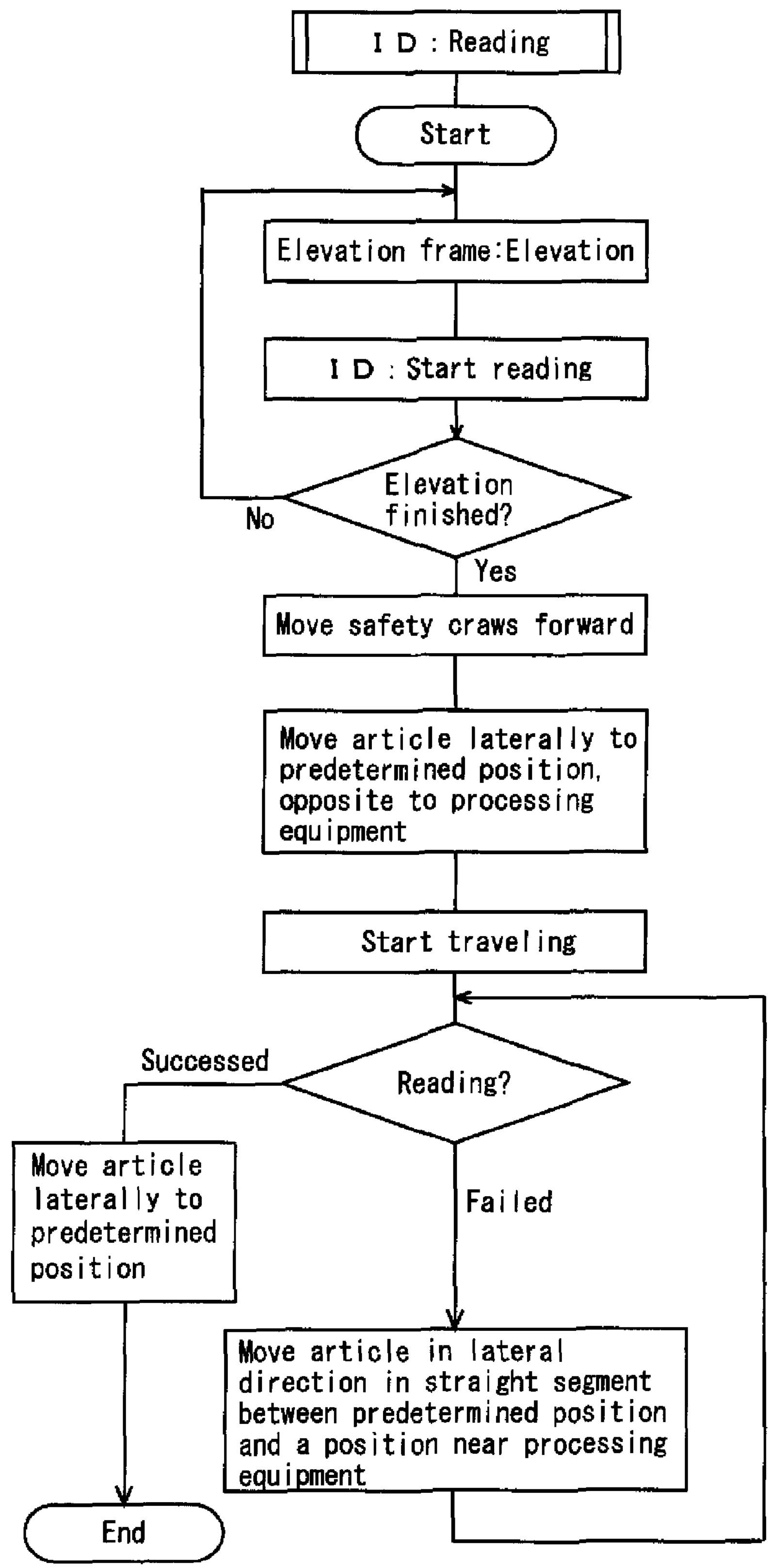

OVERHEAD TRAVELING VEHICLE HAVING ID READER

TECHNICAL FIELD

The present invention relates to an overhead traveling vehicle. In particular, the present invention relates to a technique of reading IDs of transported articles.

BACKGROUND ART

Techniques of providing an ID reader for an overhead traveling vehicle, and reading IDs of transported articles using the ID reader are known (for example, see Japanese Laid-Open Patent Publication No. 2002-182743). However, in some cases, the overhead traveling vehicle cannot read the ID depending on the size of the article, or the position where the ID is attached.

DISCLOSURE OF THE INVENTION

Problems to be Solved by the Invention

An object of the present invention is to make it possible to reliably read IDs of articles.

Another object of the present invention is to prevent the increase in the cycle time for transportation due to reading of IDs.

Still another object of the present invention is to prevent obstruction of elevation and lateral movement of an article by an ID reader of an overhead traveling vehicle.

Means for Solving the Problems

An overhead traveling vehicle according to the present invention comprises an ID reader for reading an ID of an article, and means for moving the article in a lateral direction perpendicular to a traveling direction of the overhead traveling vehicle in a horizontal plane. The article is moved in the lateral direction for allowing the ID of the article to be read by the ID reader.

In the present invention, for reading an ID of an article mounted on an overhead traveling vehicle by an ID reader of the overhead traveling vehicle, the ID of the article is read by the ID reader while moving the article in a lateral direction perpendicular to a traveling direction of the overhead traveling vehicle in a horizontal plane.

Preferably, the article is moved in the lateral direction during traveling of the overhead traveling vehicle for allowing the ID of the article to be read by the ID reader.

Further, it is preferable that the overhead traveling vehicle further comprises an elevation frame for suspending, and elevating the article from a load port for processing equipment to a storage position, and the ID reader is provided at a position deviated from an elevation path of the article, below a bottom surface of the article elevated to the storage position, for reading the ID attached to a lower position of the article.

Further, it is particularly preferable that the overhead traveling vehicle further comprises an elevation frame for suspending, and elevating the article from a load port for processing equipment to a storage position, the ID reader is provided at a position deviated from an elevation path of the article, and after the article is elevated to the storage position, the elevation frame and the article are moved in the lateral direction by a predetermined distance, away from the processing equipment for allowing the ID to be read by the ID reader during movement in the lateral direction.

Advantages of the Invention

In the present invention, by moving the article in the lateral direction to read the ID using the ID reader, even if the ID reader failed to read the ID at the first position, the ID can be read during the lateral movement. Thus, reading failures of the ID can be almost eliminated.

By moving the article to read the ID during traveling of the overhead traveling vehicle, it is possible to prevent the increase in the cycle time due to reading of the ID.

Further, in the case where the overhead traveling vehicle further comprises an elevation frame for suspending, and elevating the article from a load port for processing equipment to a storage position, and the ID reader is provided at a position deviated from an elevation path of the article, below a bottom surface of the article elevated to the storage position, for reading the ID attached to a lower position of the article, elevation and lateral movement of the article are not obstructed by the ID reader.

Further, in the case where the ID is read while the article is moved in the lateral direction by a predetermined distance, away from the processing equipment, the ID can be read during lateral movement for preventing interference between the processing equipment and the article. If reading of the ID fails, the following processes may be carried out for example.

The overhead traveling vehicle may start traveling, and move the article laterally in a segment without any interference between the processing equipment and the article. In this case, start of traveling is not delayed due to the failure of reading the ID. Alternatively, the overhead traveling vehicle may remain stopped, and move the article laterally back and forth to the right and left. After reading of the ID is finished, the article is moved in the lateral direction away from the processing equipment, and traveling is started. The segment without any interference between the processing equipment and the article is a straight segment or a segment without any processing equipment, on a map of travel routes stored by the overhead traveling vehicle.

BRIEF DESCRIPTION OF THE DRAWINGS

FIG. 2 is a side view showing the travel rail and the overhead traveling vehicle according to the embodiment.

FIG. 4 is a graph schematically showing lateral movement of the article for reading the ID, in the overhead traveling vehicle according to the embodiment.

FIG. 5 is a flowchart showing an algorithm of reading an ID of an article in a modified embodiment.

DESCRIPTION OF THE NUMERALS

Figure 1:
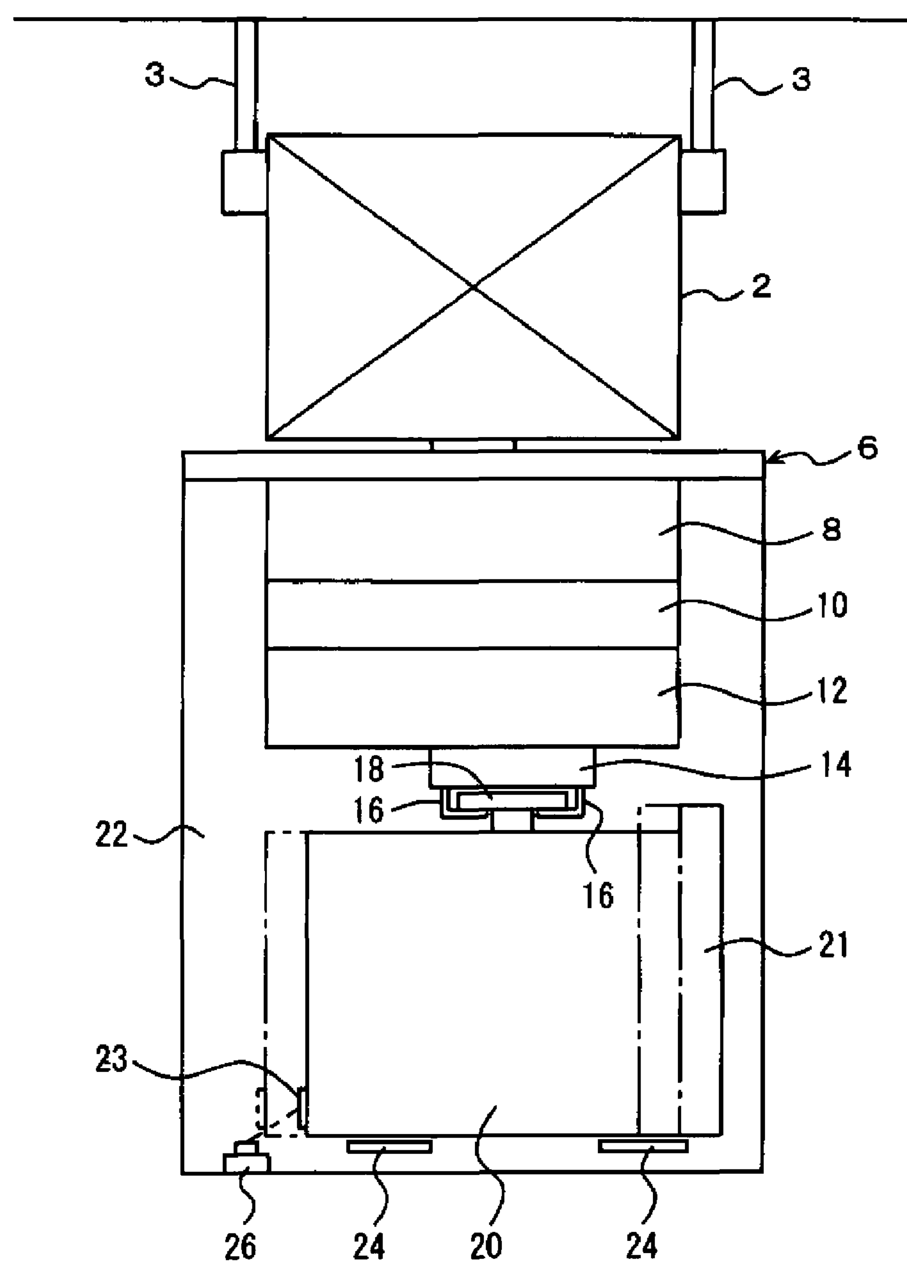
FIG. 1 is a front view showing a travel rail and an overhead traveling vehicle according to an embodiment, in a state where a front side safety cover is detached.

2: travel rail
3: support column
4: overhead traveling vehicle
6: base
8: lateral drive
10: θ drive
12: elevation drive unit

14: elevation frame
16: chuck
18: flange
20: cassette
21: lid
22: safety cover
23: ID
24: safety claw
25: arm
26: ID reader

EMBODIMENTS

FIGS. 1 to 4 show an overhead traveling vehicle 4 according to an embodiment and its operation. In the drawings, a reference numeral 2 denotes a travel rail, and reference numerals denote 3 support columns. For example, the travel rail 2 is supported by the support columns 3 from a ceiling of, e.g., a clean room. An overhead traveling vehicle 4 travels along the travel rail 2 by a travel drive unit provided inside the travel rail 2. The overhead traveling vehicle 4 has a power reception unit in the travel rail 2 for receiving electricity in a non-contact manner.

The travel drive unit of the overhead traveling vehicle 4 supports a base 6, and a lateral drive 8, a θ drive 10, and an elevation drive unit 12 are provided under the base 6. The lateral drive 8 moves the θ drive 10 and the elevation drive unit 12 in a lateral direction. The θ drive 10 rotates the elevation drive unit 12 in a horizontal plane. The θ drive 10 may not be provided. In the specification, a direction perpendicular to a traveling direction of the travel rail 2 is referred to as the lateral direction. The elevation drive unit 12 elevates and lowers an elevation frame 14. For example, the elevation frame 14 has a pair of chucks 16 for supporting the bottom surface of a flange 18 of a cassette 20 as a transported article, to elevate or lower the cassette 20. A reference numeral 21 denotes a lid of the cassette 20. An ID 23 is attached to the cassette 20 at the center at a lower position on the back surface side as viewed from the lid 21 of the cassette 20. For example, a barcode or an RFID is used as the ID 23.

For example, a pair of safety covers 22 are provided on the front and rear sides of the base 6 of the overhead traveling vehicle 4. Safety claws 24 are provided below the safety covers 22. The safety claws 24 are pulled into or pulled out of the safety covers 22 for preventing the cassette 20 from being dropped undesirably. An ID reader 26 is provided on an arm 25 extending from, e.g., one of the front and rear safety covers 22. The ID 23 of the cassette 20 is read using the ID reader 26. A position where elevation of the elevation frame 14 is finished, and the overhead traveling vehicle 4 stores the cassette 20 is a storage position of the cassette 20. The upper surface of the ID reader 26 is lower than the bottom surface of the cassette 20 at the storage position. The ID reader 26 is provided outside an elevation path of the cassette 20 in the lateral direction. Thus, the ID reader 26 does not interfere with elevation or lateral movement of the cassette 20. The arm 25 is rotatable in the horizontal plane. For example, the arm 25 may move back and forth between a position where the ID reader 26 is stored on the safety cover 22 side, and a position where the ID reader 26 is outside the elevation path below the ID 23.

There are various sizes of cassettes 20. Therefore, when the cassette 20 is simply elevated to the storage position, it may not be possible to read the ID 23 by the ID reader 26. In the case where it is not possible to read the ID 23, it is not possible to confirm which cassette is being transported by the overhead traveling vehicle 4. Therefore, it is necessary to reliably read the ID 23 of the cassette 20. Further, it is not preferable that the cycle time of the overhead traveling vehicle increases due to reading of the ID 23.

Figure 3:
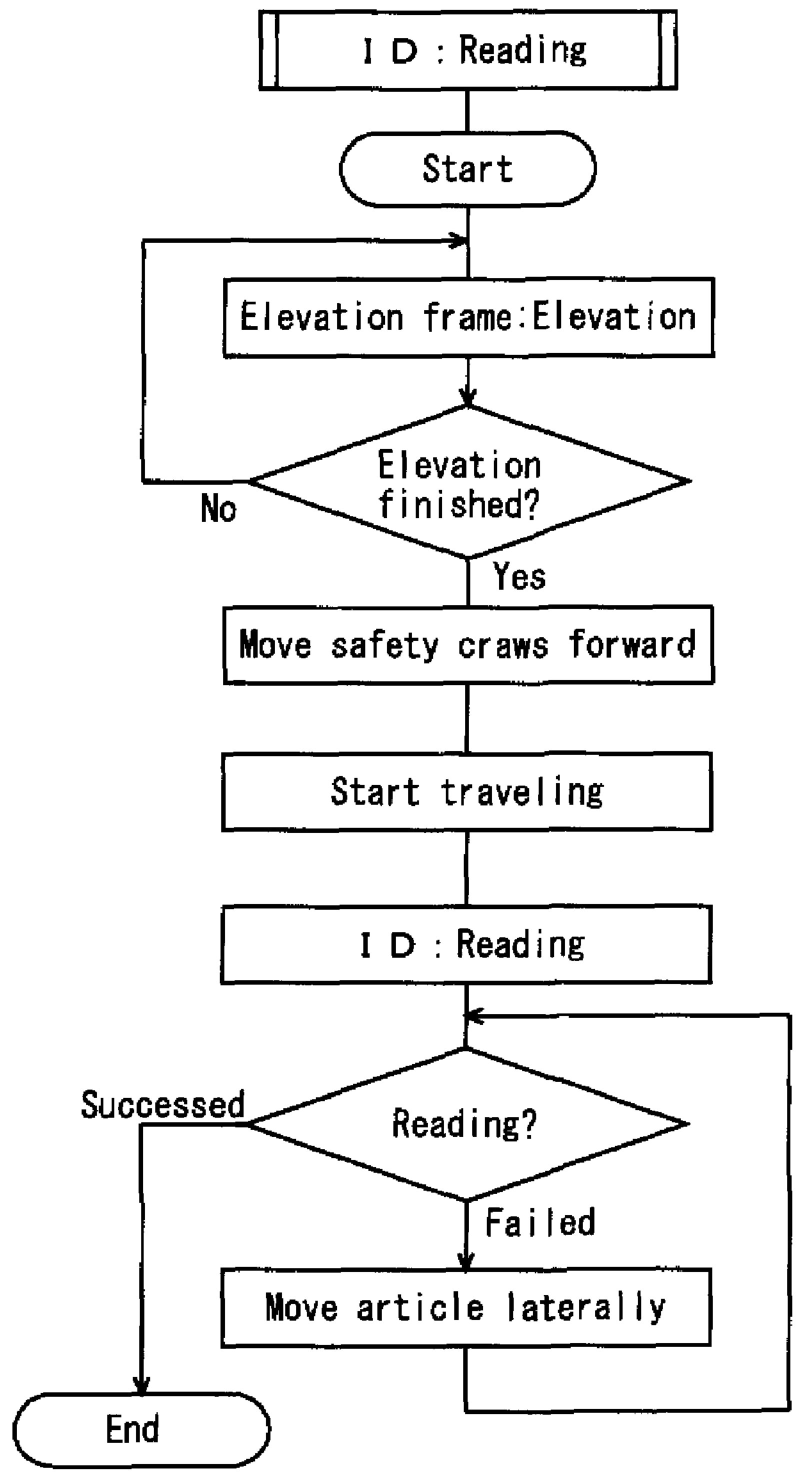
FIG. 3 is a flowchart showing an algorithm of reading an ID of an article, in the overhead traveling vehicle according to the embodiment.

FIG. 3 shows an algorithm of reading an ID. The elevation frame 14 is lowered, and the flange 18 of the cassette 20 is supported by the chucks 16. Then, the elevation frame 14 is elevated by the elevation drive unit 12 to the storage position to finish elevation. Thereafter, the safety claws 25 move forward from the safety covers 22, and the overhead traveling vehicle 4 starts traveling along the travel rail 2. Then, at a suitable timing, e.g., when elevation of the cassette 20 is finished, the ID reader 26 reads the ID 23. Reading of the ID 23 can be started at an arbitrary timing after the cassette 20 is elevated, and the ID 23 passes a position near the ID reader 26. At the time of reading the ID 23 for the first time, if reading of the ID 23 fails, the cassette 20 moves laterally to the left or the right as described later, for attempting to read the ID 23 again.

If reading of the ID 23 fails, the lateral drive 8 moves the θ drive 10, the elevation drive unit 12, and the elevation frame 14 laterally. In the meanwhile, the ID reader 26 reads the ID 23. Thus, even if reading of the ID 23 fails at the position where elevation of the cassette 20 is finished, by changing the position of the cassette 20 relative to the ID reader 26, it is possible to reliably read the ID 23. Further, since the cassette 20 moves laterally during traveling of the overhead traveling vehicle 4, the cycle time of the overhead traveling vehicle 4 does not increase.

FIG. 4 schematically shows lateral movement of the cassette. The cassette is moved in a lateral direction from the position where elevation is finished (storage position). During the lateral movement, the ID is read. From the position where elevation is finished, for example, the cassette is moved laterally by a predetermined distance toward the ID reader on the side opposite to the lid of the cassette. In the meanwhile, the ID is read. If the ID is read successfully, after the cassette is pulled toward the ID reader by the predetermined distance, the lateral movement is stopped. In this manner, by transporting the cassette at a position remote from a position right above the load port, i.e., at a position remote from the processing equipment in the lateral direction, interference with the processing equipment is reliably prevented. In the case where the ID cannot be read, the cassette 20 is moved back in the lateral direction to attempt to read the ID again. If the ID is read successfully during the lateral movement, the lateral movement of the cassette is stopped, and the cassette is held at a predetermined position. It should be noted that the ID may be read while moving the cassette laterally or the ID may be read after temporarily stopping the cassette during the lateral movement.

In the embodiment, the following advantages can be obtained.

(1) By moving the cassette 20 laterally to the left or right for reading the ID 23, it is possible to read the ID 23 reliably.

(2) Since the lateral movement of the cassette is carried out during traveling of the overhead traveling vehicle 4, the cycle time of the overhead traveling vehicle does not increases.

(3) The ID reader 26 does not obstruct elevation or lateral movement of the cassette 20.

In the embodiment, the overhead traveling vehicle elevates the cassette 20 using the elevation frame 14. Alternatively, another type of the overhead traveling vehicle in which the cassette 20 is placed, e.g., on the upper surface of the overhead traveling vehicle may be adopted. Also in this case, by moving the cassette laterally using a conveyor for transfer of articles, it is possible to reliably read the ID during traveling of the overhead traveling vehicle.

MODIFIED EMBODIMENT

FIG. 5 shows an algorithm of reading an ID according to a modified embodiment. The modified embodiment is the same as the above-described embodiment except the timing of reading the ID. A plurality of pieces of processing equipment (not shown) are provided on one of the left and right sides of the travel rail 2 for the overhead traveling vehicle 4. Load ports for the processing equipment are provided right under the travel rail 2. In the modified embodiment, the arm 26 having the ID reader 26 is fixed at a position deviated from the elevation path of the cassette 20 (article). This position is opposite to the processing equipment in the lateral direction, as viewed from the travel rail 2. The overhead traveling vehicle 4 transfers the article to or from the load port for the processing equipment by elevating, and lowering the elevation frame 14. The overhead traveling vehicle 4 stores a map having data of the travel routes and the layout of the load ports. In the map, the travel routs are divided, e.g., into straight segments, curve segments, and diverging (merge) points. While elevating the elevation frame 14, the overhead traveling vehicle 4 starts to read the ID using the ID reader 26. When elevation of the elevation frame 14 is finished, the safety craws 24 move forward to the cassette 20. Then, the overhead traveling vehicle 4 moves the elevation frame 14 and the cassette 20 laterally, to a position opposite to the processing equipment. The lateral direction is a direction perpendicular to the traveling direction in a horizontal plane. All the pieces of processing equipment are provided on one of the left and right sides of the travel rail 2. While moving the elevation frame 14 and the cassette 20 away from the processing equipment by a predetermined distance, e.g., by 10 to 100 mm, if the ID is read successfully, reading is finished, and the overhead traveling vehicle 4 starts to travel along the travel rail 2. At this time, the cassette is transported at a position moved by the predetermined distance laterally to the left or right, oppositely to the processing equipment.

Also in the case where a reading failure occurs, the overhead traveling vehicle 4 starts traveling, and moves the cassette to the left or right toward a position near the processing equipment in lateral direction, from the predetermined position. The stroke of the lateral movement is about 10 to 100 mm from a position right above the load port, in both of the direction to the left and the direction to the right. Interference between the cassette and the processing equipment may occur when the cassette is swayed in the curve segment or the like, and protrudes from the overhead traveling vehicle 4 toward the processing equipment. Therefore, in the case of the stroke of about 10 to 100 mm from a position right above the load port, in both of the direction to the left and the direction to the right, no interference occurs in the absence of any sway. The overhead traveling vehicle 4 identifies whether the overhead traveling vehicle 4 is traveling along the straight segment or the curve segment based on the map or the like, and the lateral movement is carried out in the straight segment where no significant sway occurs. If the ID is read successfully, the cassette is moved laterally to the predetermined position. Alternatively, the overhead traveling vehicle may detect a segment without any load ports based on the map to move the cassette laterally. In the case where ID cannot be read even if the lateral movement is repeated in several cycles, for example, it is determined that a reading error occurs.

In the modified embodiment, the following advantages can be obtained.

(1) Since the article is moved away from the processing equipment laterally to the predetermined position, it is possible to reliably prevent interference between the article and the processing equipment.

(2) Since the ID is read in the middle of the lateral movement to the predetermined position, the cycle time does not increase due to reading of the ID.

(3) If an ID reading failure occurs in the middle of the lateral movement to the predetermined position, the ID is read during traveling. At this time, the lateral movement is carried out in the straight segment, or the segment without any no load ports, i.e., in the segment without any processing equipment, for preventing interference between the article and the processing equipment.

The invention claimed is:

1. An overhead traveling vehicle, comprising:

an ID reader for reading an ID of an article; and a lateral drive moving the article in a lateral direction in a horizontal plane which is perpendicular to a traveling direction of the overhead traveling vehicle, wherein said ID reader reads the ID of the article while the article is laterally moved by said lateral drive, said overhead travelling vehicle further comprising an elevation frame for suspending, and elevating the article from a load port for processing equipment to a storage position, wherein said ID reader is provided at a position deviated from an elevation path of the article, and wherein after the article is elevated to the storage position, the elevation frame and the article are moved in the lateral direction by a predetermined distance, away from the processing equipment, thereby allowing the ID to be read by the ID reader during movement in the lateral direction.

2. The overhead traveling vehicle according to claim 1, wherein said lateral drive can laterally move the article during traveling of the overhead traveling vehicle to allow the ID of the article to be read by the ID reader.

3. A method of reading an ID of an article mounted on an overhead traveling vehicle by an ID reader of the overhead traveling vehicle, the method comprising the steps of:

moving the article in a lateral direction perpendicular to a traveling direction of the overhead traveling vehicle in a horizontal plane; and reading the ID of the article by the ID reader while moving the article in the lateral direction wherein the overhead traveling vehicle includes an elevation frame for suspending and elevating the article from a load port for processing equipment to a storage position, wherein the ID reader is provided at a position deviated from an elevation path of the article, and wherein after the article is elevated to the storage position, the elevation frame and the article are moved in the lateral direction by a predetermined distance, away from the processing equipment thereby allowing the ID to be read by the ID reader during movement in the lateral direction.

4. The overhead traveling vehicle according to claim 1, wherein said ID reader is disposed on an arm which extends from a front of the vehicle to a rear of the vehicle.

5. The overhead travelling vehicle of claim 4, wherein said arm is rotatable in the horizontal plane.

* * * * *